(12) United States Patent
Hassell

(10) Patent No.: US 6,228,525 B1
(45) Date of Patent: May 8, 2001

(54) BATTERY CELL PLUG

(76) Inventor: Donald S. Hassell, 37 Westdale Rd., Holbrook, MA (US) 02343-1060

(*) Notice: Subject to any disclaimer, the term of this patent is extended or adjusted under 35 U.S.C. 154(b) by 0 days.

(21) Appl. No.: 09/358,353

(22) Filed: Jul. 21, 1999

Related U.S. Application Data

(60) Provisional application No. 60/095,332, filed on Aug. 4, 1998.

(51) Int. Cl.$^7$ ........................................... H01M 2/36
(52) U.S. Cl. ................................. 429/64; 429/76
(58) Field of Search ................... 429/76, 77, 80, 429/63, 64; 137/260; 141/198, 199

(56) References Cited

U.S. PATENT DOCUMENTS

| | | | |
|---|---|---|---|
| 2,104,672 | * 1/1938 | Rainer . | |
| 3,434,887 | 3/1969 | Seckinger . | |
| 4,007,764 | 2/1977 | Bandemor | 141/35 |
| 4,113,925 | 9/1978 | Kohler et al. | 429/78 |
| 4,154,904 | * 5/1979 | Michael | 429/64 |
| 4,219,612 | 8/1980 | Tatlock | 429/86 |
| 4,386,141 | 5/1983 | Weidner et al. | 429/64 |
| 4,522,896 | 6/1985 | Iseard | 429/63 |
| 4,749,633 | 6/1988 | Elias | 429/64 |
| 5,002,100 | 3/1991 | Frederick | 141/35 |
| 5,284,176 | 2/1994 | Campau . | |
| 5,678,615 | * 10/1997 | Hughes | 141/209 |

FOREIGN PATENT DOCUMENTS

2432063 * 11/1979 (FR) .
2011157 * 7/1979 (GB) .

* cited by examiner

Primary Examiner—Stephen Kalafut
Assistant Examiner—Jonathan Crepeau
(74) Attorney, Agent, or Firm—D. Michael Burns

(57) ABSTRACT

The invention relates to a gravity filling system for adding water to wet cell batteries. The system is for one or more batteries and incorporates a new and improved cell plug which will reduce risk of hazardous gases and toxic acids to the operator. The cell plug incorporates a styrofoam packed float chamber, that forces a float needle to seal off the cell when the water level reaches a predetermined desirable level. The device fills the battery level without overfilling which can be as detrimental as not filling it enough. The operator can by visual inspection ascertain when the filling of any particular battery has been completed.

10 Claims, 8 Drawing Sheets

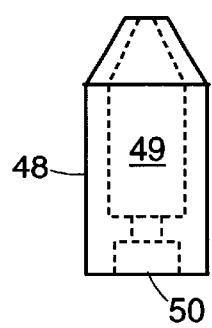
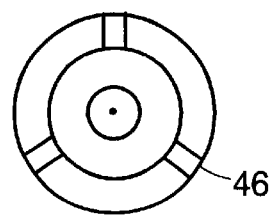
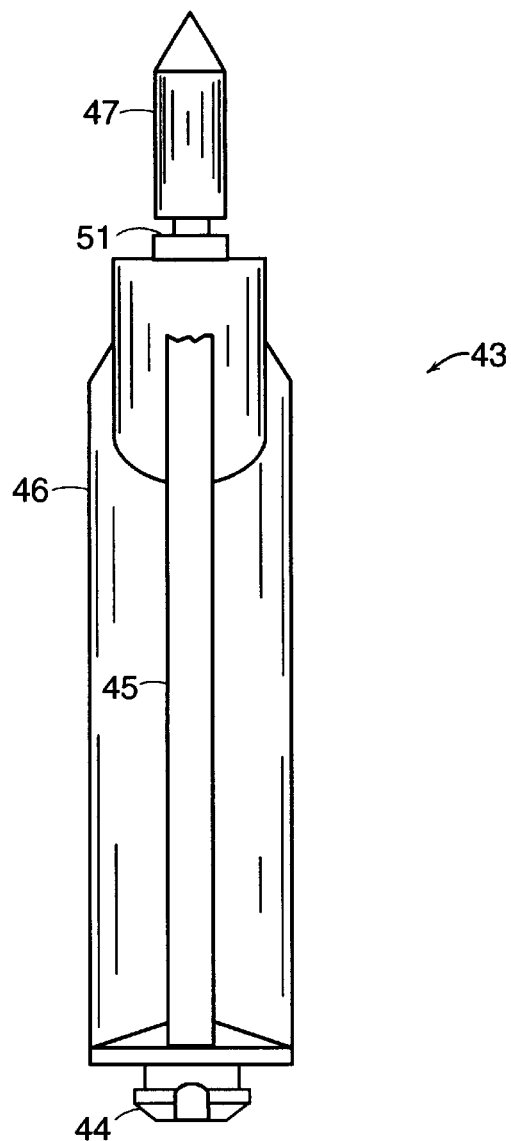
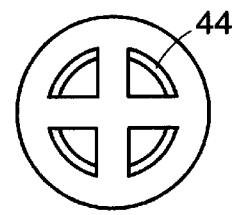
FIG. 8b
FIG. 8   FIG. 8a

BATTERY CELL PLUG

CROSS REFERENCE TO RELATED APPLICATION

This application is based on Provisional Patent Application Ser. No. 60/095,332 filed on Aug. 4, 1998.

BACKGROUND OF THE INVENTION

1. Field of the Invention

The present invention relates generally to the safe refilling of battery cells to a predetermined level. More particularly, the present invention pertains to a new and improved battery electrolyte cell plug which automatically controls the liquid level in the battery cell.

2. Description of the Prior Art

There is an inherent danger in refilling the electrolyte levels of wet cell batteries. For instance, the batteries of an electric golf cart need to be recharged after a designated period of use. Most course maintenance programs charge the batteries every day if the golf cart was used for 18 holes. This constant charging and discharging will result in loss of electrolyte due to evaporation. If the level of electrolyte in a given battery cell drops below the tops of the electrode plates, irreparable damage to the plates can occur. Also there is an increased corrosion of active material which leads to the detriment of cell life and quite often there is an increased risk of arcing between exposed, and possibly faulty plates, which could ignite any inflamable gases present. High temperatures in the cells will also cause expansion of the electrolyte. It is thereby important, to not only allow for expansion of the electrolyte in the cells by venting and dispensing of explosive gas mixtures, but also to periodically add electrolyte to the cells to compensate for the inherent losses.

Care must be also be exercised in order not to overfill the cells. If the intended liquid level is exceeded, this represents a reduction of the gasing space in the battery interior above the liquid level. This space is required for the collection of the gas/electrolyte mixture that forms during the operation and especially the charging of the battery. An overfilled cell may prevent oxygen and hydrogen, which are generated within the battery, from safely escaping into the atmosphere. A build up of these gases may buckle the plates and possibly lead to an explosive condition.

Maintenance personnel at golf courses are often relatively inexperienced. It is common for golf courses to hire teenagers for a summer job. Safety therefore is of paramount importance. The first step in refilling a battery is to remove the plugs, which in the case of a golf cart having six batteries would total 18 cell plugs. While refilling there is the danger of accidental splashing of sulfuric acid electrolyte on clothes, skin or eyes. The present invention seeks to provide a system whereby the danger to personnel is minimized, if not entirely eliminated, and the refilling operation reduced to a fraction of the time presently necessary. A very important factor when some golf courses have upwards of 60 to 80 golf carts.

U.S. Pat. No. 3,434,887 issued to A. E. Seckinger on Mar. 25, 1969, teaches the use of an apparatus to refill golf cart batteries. Seckinger shows the use of an automatic refill system that utilizes a pump to generate water flow. This system requires outside power to refill the cells.

U.S. Pat. No. 5,284,176 issued to Daniel Campau on Feb. 8, 1994, discloses a system for refilling a series of interconnected battery cells to a predetermined level by using individual refill valves, each associated with a single cell. A single supply reservoir is taught. Campau directs his teachings more to the composition of the supply tubing.

U.S. Pat. No. 4,749,633 issued to Leonard W. Elias on Jun. 7, 1988, shows a device that is mounted in the battery cell opening which receives the water. He utilizes a float that causes a valve pin to rise or fall in response to the liquid level in the cell.

U.S. Pat. No. 5,002,100 issued to Patrick Frederick on Mar. 26, 1991, discloses a gravity feed water reservoir which feeds water to a plurality of cell openings. Frederick discloses a valve member extending into each cell but not as a cell cap.

U.S. Pat. No. 4,522,896 issued to Barry S. Iseard on Jun. 11, 1985, teaches of an automatic watering system and the use of cell caps, adapted for retrofitting an existing battery.

U.S. Pat. No. 4,007,764 issued to Royal F. Bandemor on Feb. 15, 1977 is an automatic fluid filling device wherein the device itself consists of a plurality of members, each removably insertable into a battery cell. The cells are connected in series with the reservoir at one end of the series. This system requires a pump for recirculation.

U.S. Pat. No. 4,386,141 issued to Evert C. Weidner et al. on May 31, 1983, teaches a battery watering refill device for maintaining a predetermined electolyte level in each cell of a battery.

U.S. Pat. No. 4,219,612 issued to Edwin Tatlock on Aug. 26, 1980, teaches the use of a vent plug to allow the potential explosive mixture of gases to vent through the safety of a flame trap.

U.S. Pat. No. 4,113,925 issued to Werner Kohler et al. on Sep. 12, 1978, teaches the need to address the dangers of over filling an electrolyte cell and hazardous gas/electrolyte mixture that forms during the charging of the battery.

The concepts of the present invention are suggested for a host of possible applicatons. Electrically powered golf carts are discussed, but many other possible applications are readily seen. One large application area would be in material handling equipment where the handling unit comprises the use of multiple packs of batteries. Therefore, it will be appreciated that the invention can be utilized by any equipment that is battery powered and the batteries are intended to be periodically recharged.

None of the above inventions, taken either singularly or in combination, are seen to describe the instant invention as claimed.

SUMMARY OF THE INVENTION

The present invention relates to an improved battery cell plug for permitting wet-cell batteries to be safely refilled, whether it be a single battery or multiple battery packs. The present invention does not require any outside power to circulate the refilling water, but can rely solely on gravity to feed the water into each electrolyte cell. However, the design concepts of the present invention battery plug would be equally effective regardless of the means for supplying water. The instant invention seeks to provide a refilling system that diminishes the risk of toxic and explosive gas hazards.

The new and improved cell plugs will replace the original battery plugs. In most circumstances this would consist of three cell plugs per battery. An application example would be a golf cart, the majority of carts employing six batteries for a total of 18 cell plugs per cart.

The instant invention will allow for the simultaneous filling of a single battery of a group of batteries with the same effortless ease. Each cell plug allows the cell to fill and individually shutoff at the the proper level. The cells do not require a sight gauge but rather only a visual sighting of water overflowing when the batteries are full. The water supply means will simply be closed when the procedure is complete. The new cell plug fits into the battery exactly as did the original equipment plug. Installation of the present invention does not require changes to be made to any battery arrangements, since all parts are snap-fitted into place.

Accordingly, it is a principal object of the invention to provide a refill system with a cell cap plug which will indicate to the operator when to shut off the flow of water upon the cell being filled to its required level.

It is another object of the invention to provide a cell cap that will not allow any acid/electrolyte to escape which causes weakening of the battery and also environmental damage.

It is a further object of the invention to provide a chamber float in the overflow cap which will prohibit any unwanted venting, thereby restricting the venting to the passive area vent hole of the cell cap.

It is yet another object of the invention to provide a system which does not require an external power source, but uses gravity to force the liquid through the system.

It is an object of the invention to provide a safe refill system whereby any possible sulfuric acid accumulation will not come into contact with the operator's skin, eyes or clothing.

It is also an object of the invention to provide a system that can be operated by a person with a marginal level of mechanical skills.

It is an object of the invention to provide a system whereby the entire process is self contained with only the addition of water being required of the operator, possibly from a reservoir tank.

It is another object of the invention to have all parts interchangeable with the original battery parts.

It is yet another object of the invention to have an inexpensive system with virtually all parts manufactured out of plastic or rubber material.

It as a further object of the invention to provide a filling system which minimizes the risk of being splashed by acid or having a spark ignite the hydrogen gas that is often lurking about. All pieces and parts are acid resistant and of a non-arc producing material.

These and other objects of the present invention will become readily apparent upon further review of the following specification and drawings.

BRIEF DESCRIPTION OF THE DRAWINGS

FIG. 8 is an elevational view of the float needle.

FIG. 8*a* is a bottom view of FIG. 8.

FIG. 8*b* is a top view of FIG. 8.

Similar reference characters denote corresponding features consistently throughout the attached drawings.

DETAILED DESCRIPTION OF THE PREFERRED EMBODIMENTS

The present invention provides for a battery cell plug for permitting a wet-cell battery to be safely refilled with water. The repeated recharging of these batteries causes the dissipation of water in the electrolyte, thereby creating the need for the present invention. The new and improved battery cell plugs virtually eliminate the hazards of accidental splashing of sulfuric acid, and will also indicate to the operator when the refilling procedure is completed. The present invention will require little or no change to conventional battery structure. A major application area for the instant invention can be found in electrical golf carts where upwards of six batteries are normally employed. Other areas are with such high voltage and high powered battery applications such as in material handling equipment and electrical personnel carriers, especially those designed for the handicapped.

Figure 3:
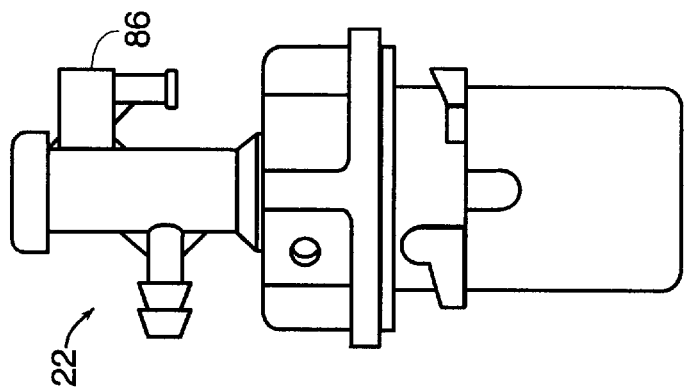
FIG. 3 is an elevated view of the basic cell plug with an overflow arrangement in the cell cap.
Figure 2:
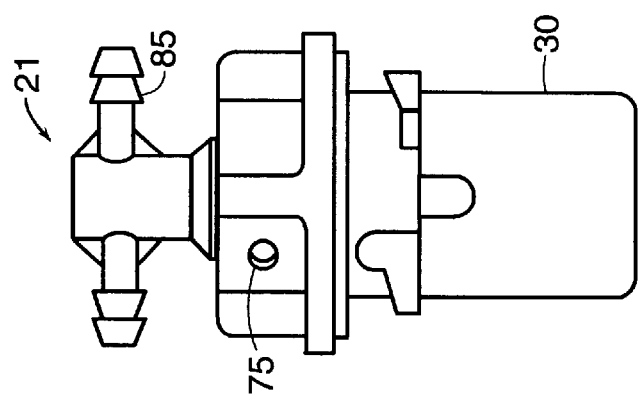
FIG. 2 is an elevated view of the S-cell plug which has a minor design alteration allowing it to be used in a series relationship with other batteries.
Figure 1:
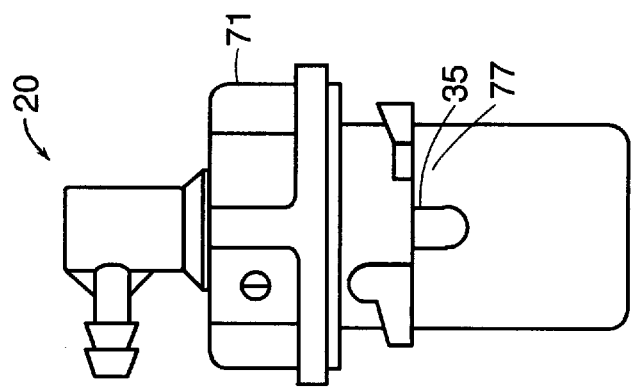
FIG. 1 is an elevated view of the basic cell plug.
Figure 4:
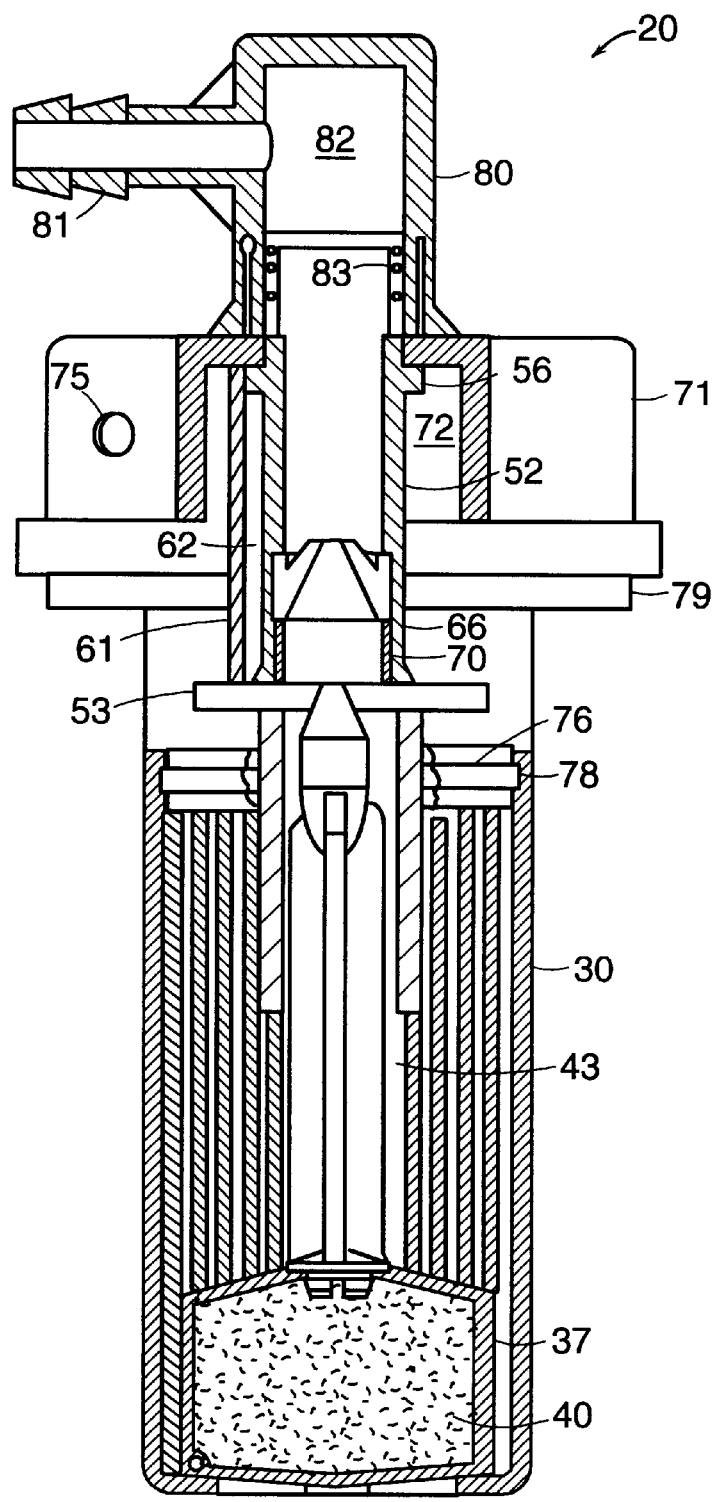
FIG. 4 is a cross-sectional view of the basic cell plug.
Figure 5:
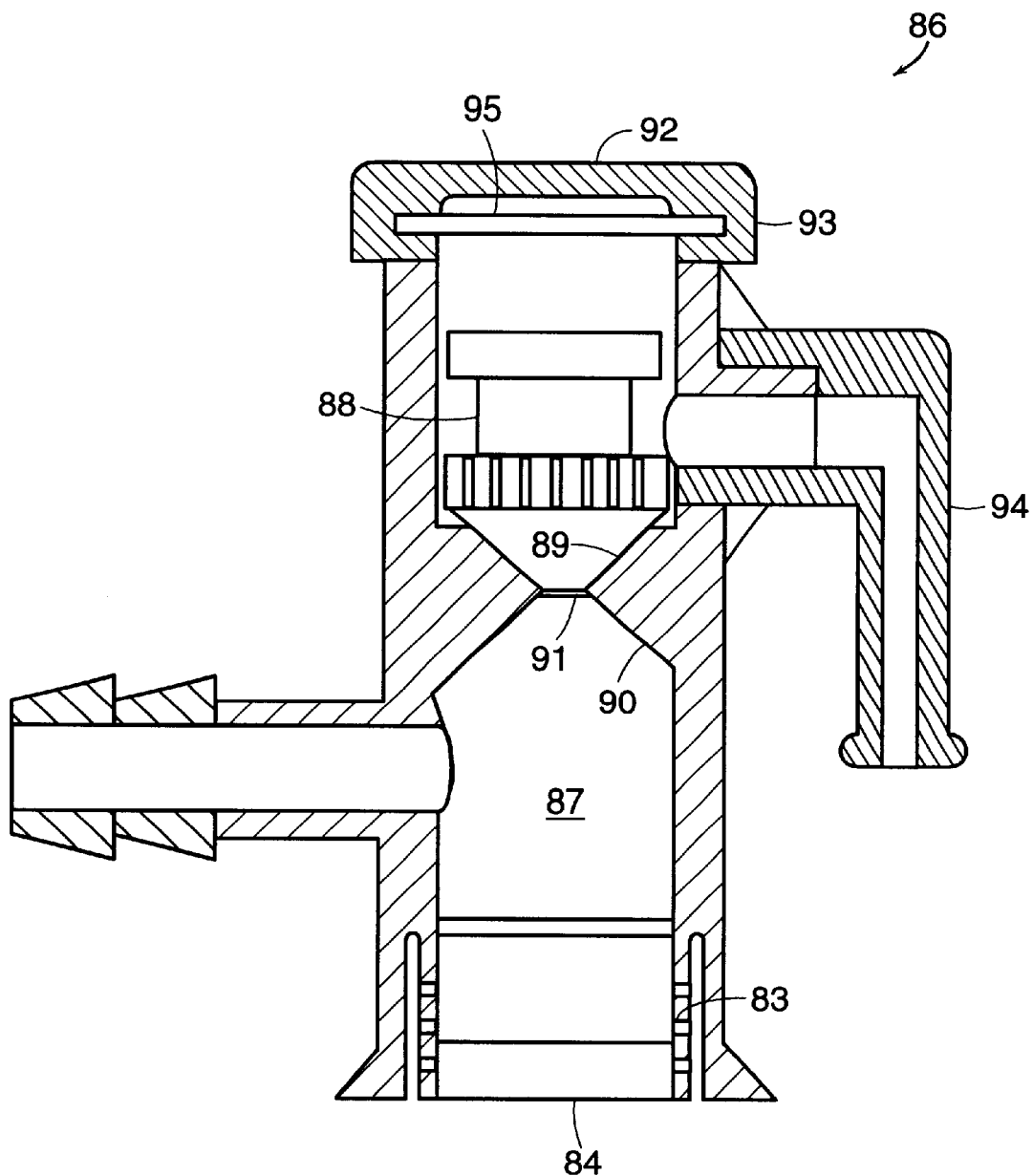
FIG. 5 is a cross-sectional view of the overflow cell cap.

A basic cell plug is generally depicted by the reference numeral 20 in the accompanying FIGS. 1 and 4. This cell plug will be described in more detail further on in the disclosure. FIG. 2 shows an S-cell plug 21 which has been modified from the basic cell plug 20 by the addition of an water exit line 85 to enable it to be used in series with other cell plugs. FIGS. 3 and 5 depict an overflow cell plug 22 which is merely the basic cell plug 20 modified to allow for refill water to overflow the plug when the battery reaches the proper level.

Figure 6:
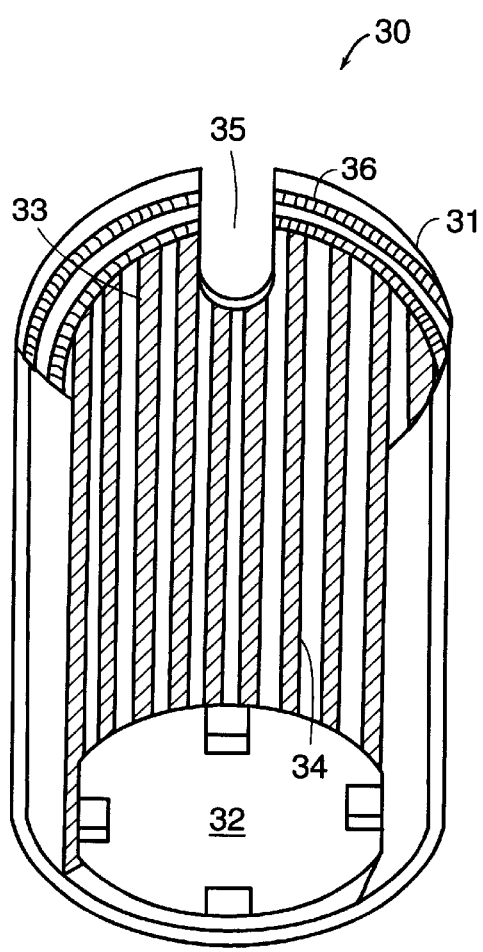
FIG. 6 is pictorial cut-a-way view of the float chamber housing.
Figure 7:
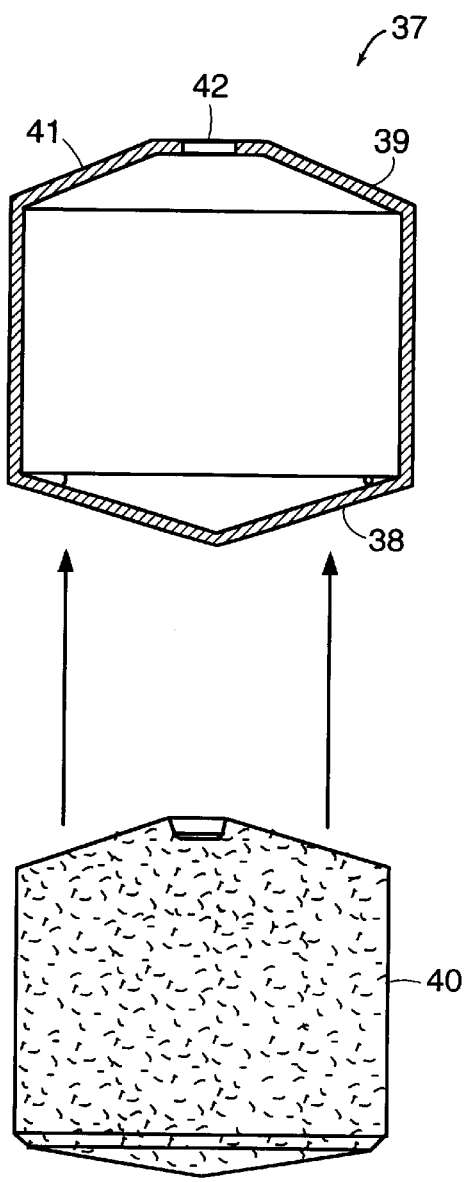
FIG. 7 is an expanded elevational view of the float container being symetrical from all sides.

As was previously discussed, the electrolyte level of a wet cell battery must be maintained in a relatively narrow range. The operation of the cell plug is critical to the entire procedure. Basic cell plug 20 has a foundation comprising of a float chamber housing 30 as shown in FIG. 6. Float chamber housing 30 is hollow and generally cylindrical with openings at the top 31 and the bottom 32. The bottom portion being insertable into the battery cell hole vacated by the original equipment cell plug. An inner annular wall 33 forms an inner chamber 34. The upper wall surface having defined therein a pair of oval shaped vent openings 35 near upper edge of wall. Inner wall 33 is fluted to reduce capillary, static and friction forces. Upper inner wall surface 33 having a preformed groove 36 defined distal-proximate therein. Slidably deposed and vertically movable in chamber housing 30 is a hollow concentric float container 37 as shown in FIG. 7. It is comprised of two sections, a concentric lower disc 38 and a concentric upper float section 39; the two sections having conventional connecting means for being snapped together. Styrofoam packing 40, having a general shape like the interior of float container 37 is placed within float container 37. An upper surface 41 of upper float section 39 being domed shaped to prevent water residue thereon and having a circular aperture 42 in the center thereof. Lower disc section 38 is also domed on the bottom to prevent air bubble entrapment. It is understood that float container 37 could also be "blow molded" and filled by injection with styrofoam. Styrofoam packing 40 prevents condensation from forming, which could add weight and upset the filling levels of the cells.

FIG. 8 depicts an elongated float needle 43 having a slotted needle bottom 44 for extending through the circular aperture 42 of float container 37 thereby forming a friction tight connection between the two bodies. Needle 43 having a longitudinally central axis stem 45 extending the length of needle 43. Needle 43 further having three equidistant fin-like projections 46 extending upwardly the length of stem 45. Float needle 43 having a concentric bullet shaped rubberized tip 47 at its upper portion. A rubberized hollow conically shaped nose cone 48, having an interior cavity 49, generally the shape of tip 47, having an opening 50, and having means for fitting tightly in a friction fit over tip 47. Nose cone 48 having an air space 51 to afford it a flexibly cushioned seal. FIG. 8a is a bottom view of needle 43 while FIG. 8b depicts a top plan view.

Figure 9A:
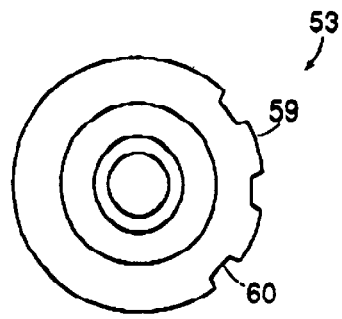
FIG. 9*a* is a top view of the vent chamber disc and needle housing tube.
Figure 9:
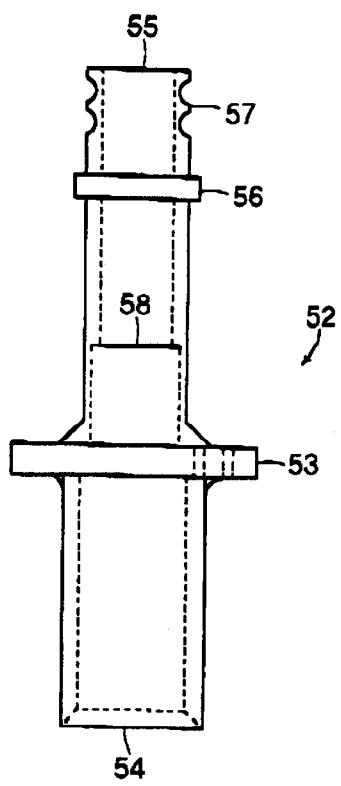
FIG. 9 is an elevation view of the needle housing tube being symetrical from all sides and the vent chamber disc molded into the tube.
Figure 10:
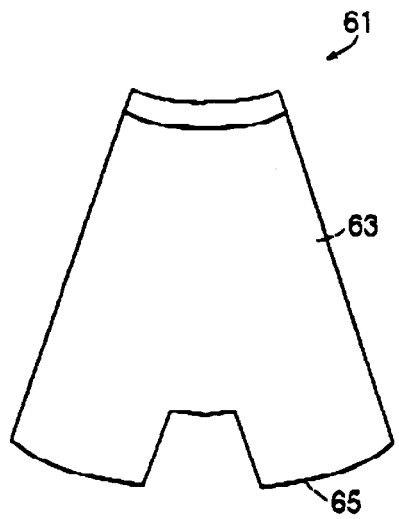
FIG. 10 is a perspective view of the vent chamber barrier.

Extending coaxially about float needle 43 is a concentrical elongated hollow needle housing tube 52 as shown in more detail in FIGS. 9 and 9a for accurately guiding float needle 43. Needle housing tube 52 having a vent chamber disc 53 molded integrally to it. Housing tube 52 having a shoulder 56 encirculating the outer surface near the upper part of tube 57. Vent chamber disc 53 is integrally molded to needle housing tube 52, with disc 53 extending within the bottom section of tube 52. Vent chamber disc 53 having a flange 59 defining vent guide ribs 60 which interact with a vent chamber barrier 61, as depicted by FIG. 10, to form a vent chamber 62. Chamber barrier 61 is longitudinally coextensive with vent chamber guide ribs 60 of disc 53, barrier 61 having a concave surface 63 centerward, and an indented end 65 outwardly meshing with vent guide ribs 60.

Figure 11A:
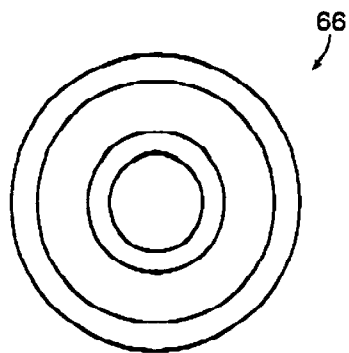
FIG. 11*a* is a top plan view of the seat seal of FIG. 11.
Figure 11:
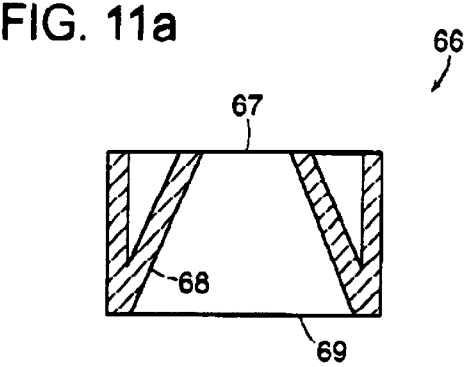
FIG. 11 is an elevational cross-sectional of the seat seal.

A molded rubber needle seat seal 66, concentric in shape, is depicted by FIGS. 11 and 11a wherein seat seal 66 is received into needle housing tube 52 by having seat seal 66 fitted into a lower opening 54 of tube 52. A tapered opening 67 of seat seal 66 is pushed upwardly against an abutment 58, which is located in the inner midpoint section of tube 52. Seat seal 66 having a tapered inner wall 68 and is molded to give greater flexibility when mated to float needle nose cone 48, which guarantees the shut off of water flow when each cell is filled to its desired level. A seal locating ferrule 70, being a concentric hollow cylinder, is pressed fit under a bottom orifice 69 of seat seal 66, flush with disc flange 59 of needle housing tube 52, whereby minor pressure is exerted on the outer diameter of needle seat seal 66 to prevent any by-pass of liquid once the battery cell is shut off by the normal action of float needle nose cone 48 and tapered opening 67 of seat seal 66.

Figure 12:
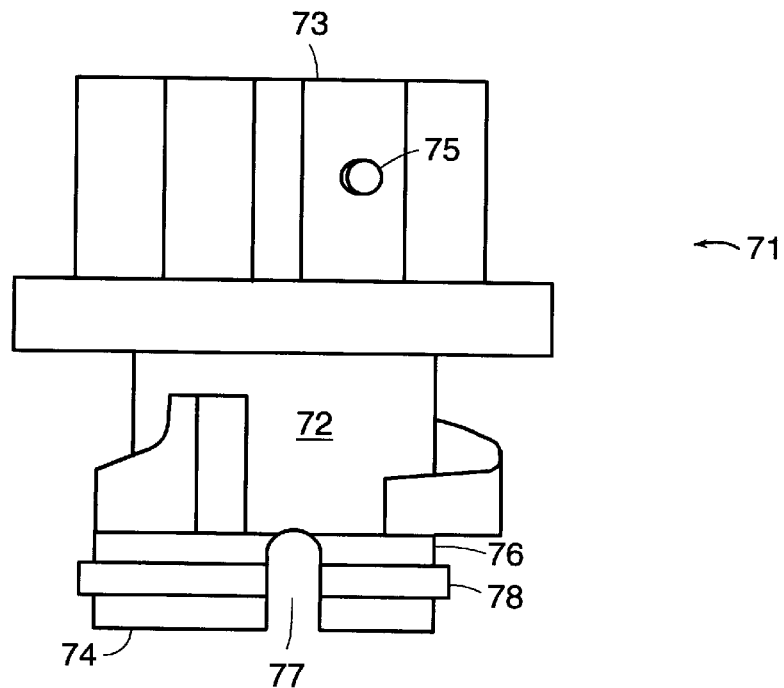
FIG. 12 is an elevational side view of the cell plug with the transition unit seated therein.
Figure 12A:
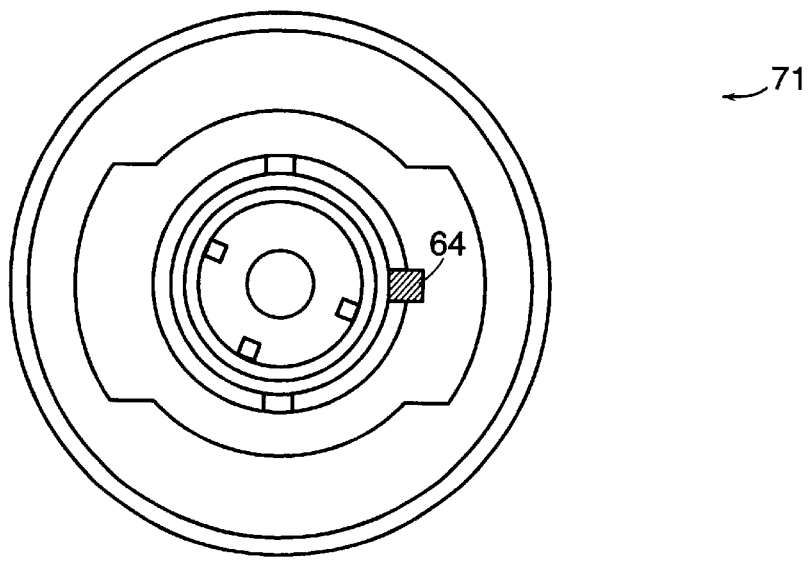
FIG. 12*a* is a bottom view of FIG. 12.

FIGS. 12 and 12a show a cell cap 71 with a cell vent hole 75, a bottom cell entry 74, and a top cell cap opening 73. Defined within the interior surface of cell cap 71 is a passageway 72. Molded into thse underside of cell cap 71 is a hollow concentrical transition unit 76 having a pair of vent slots 77 located on the bottom portion and an O-ring projection 78 encircling about the center section of unit 76. Transition unit 76 forming a bond between float chamber housing 30 and the rest of the structure. The O-ring projection 78 in a tight friction fit with preformed groove 36 of inner annular wall 33 of housing 30. The vent slots 77 are in alignment with the oval vent openings 35 of chamber housing 30. A rubber gasket seal 79 seals cell cap 71 to the battery cell. Housing tube 52 and vent chamber disc 53 are kept in the proper orientation with transition unit 76 by a key 64 as shown in FIG. 12a. Cell cap 71 accepts needle housing tube 52, seat seal 66 and locating ferrule 70 in passageway 72 of cell cap 71 which is positioned flush with the shoulder 56 of tube 52. The upper end of housing tube 52 defining an upper opening 55 protruding upwardly through cell cap 71. A plurality of protruding rings 57 deposed in close proximity to upper opening 55.

A generally hollow fill inlet cover 80 having a chamber 82 within with an open bottom 84. A plurality of circular channels 83 are defined within chamber 82 in close proximity to opening 84. The cover 80 is pressed down over the raised protruding rings 57 of the tube 52 to form a friction pressure fit with channels 83. A water fill inlet 81, which is connected to a water source 23, completes basic cell plug 20.

A modification to basic cell plug 20 is a water exit line 85 which forms the S-cell plug 21 shown in FIG. 2. This enables the plug to be used in series with other plugs.

FIGS. 3 and 5 disclose another modification of the basic cell plug 20, an overflow cell plug 22, whereby an overflow fill cover 86 has contained therein an overflow float chamber 87. Float chamber 87 having a lid opening 95 in its top section. An overflow float 88, having a conically tapered end 89 on the bottom portion, is deposed within the chamber 87 juxtaposed above a float valve section 90. Whenever the electrolyte level of the battery cell in which cell plug 22 is employed, is in an unsated state, tapered end 89 will depose within a conical seat portion 91 of valve section 90 to form a water seal which will prevent water from exiting the plug at that time. This closing also prevents any venting of gases, forcing all ventilation through the passive area of the cell cap vent hole 75. Upon reaching a fill condition, float 88 is pushed upwardly, thereby opening valve section 90 to allow water to exit through an overflow line 94. The cell cover 86 is placed on housing tube 52 in the same manner as the other plugs 20 and 21. Cell cover 86 does incorporate a chamber lid 92 which uses an O-ring type gasket 93 to engage top opening 95 of float chamber 87.

Only water is allowed to escape because the specific gravity of the electrolyte will keep it below the specific gravity of the water. It is very important that no acid or electrolyte escape which can not only weaken the battery, but can also cause serious environmental damage. The added water mixes into the cell system during charging and the mixing process is also aided when the batteries are in motion (such as when a golf cart moves).

Figure 13:
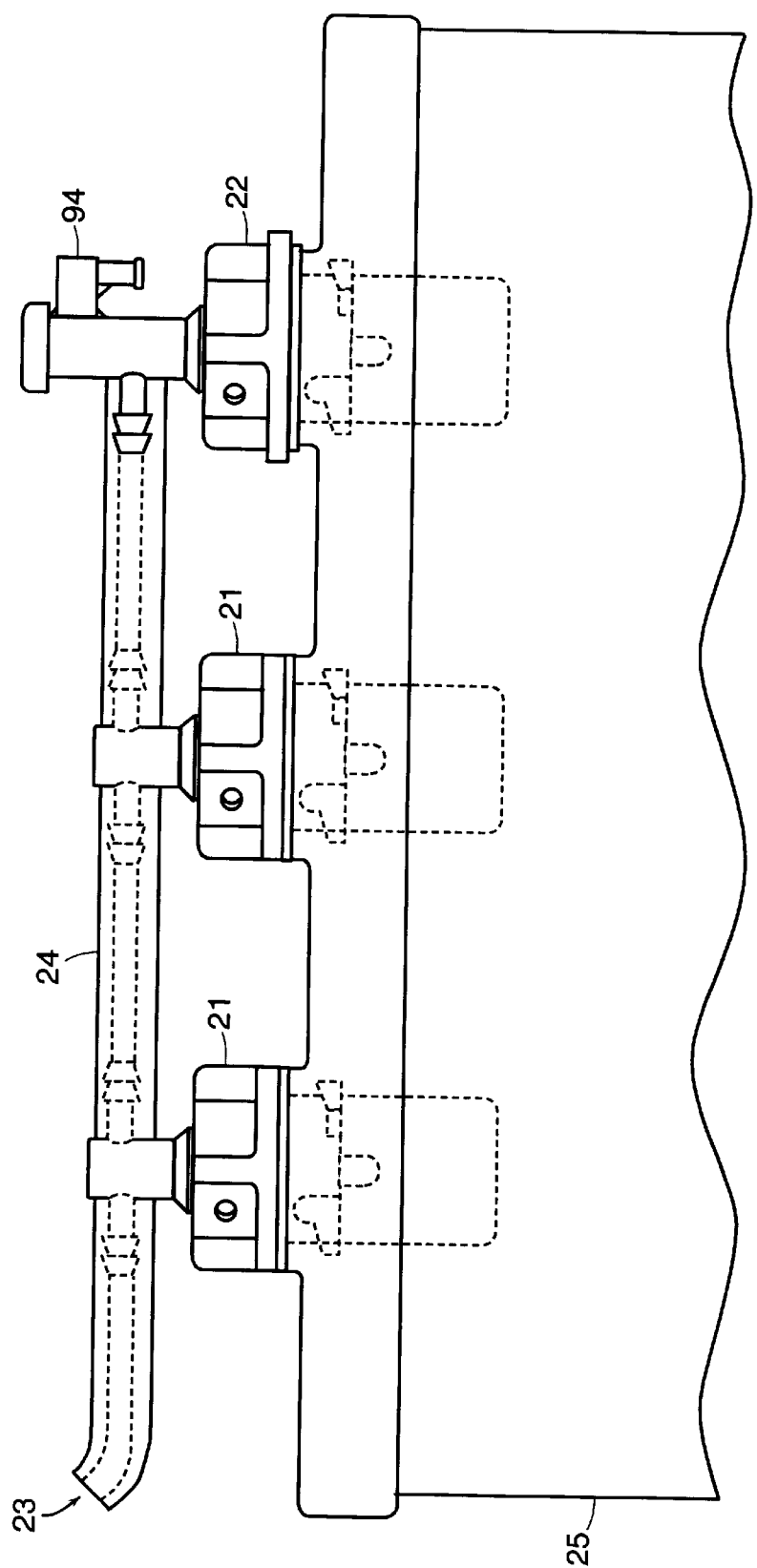
FIG. 13 is a front elevational view of the filling of a single battery with two of the S-cell plugs of FIG. 2 and one with an overflow float chamber of FIG. 3.

FIG. 13 shows a single battery 25 being refilled with three cell plugs in series. This particular configuration uses two S-cell plugs 21 and an overflow cell plug 22. Conventional means 24 are used for conveying water from one cell to another. Many differednt configurations are possible depending on the nember and arrangement of the batteries.

It is to be understood that the present invention is not limited to the embodiments described above, but encompasses any and all embodiments within the scope of the following claims.

I claim:

1. A cell plug for maintaining the electrolyte level in a wet cell battery, the cell plug comprising:

a hollow float chamber housing having a top opening and a bottom opening, an annular wall defining an inner chamber, a pair of vent openings being defined in the upper wall surface;

a hollow float container vertically movable within the chamber housing, the container being filled with styrofoam packing to prevent condensation;

an elongated float needle having a bullet shaped upper section, a slotted bottom section for friction fit engagement with the float container, whereby the float needle will reactively move in a vertical up or down direction in response to the movement of the float container;

a hollow needle housing for guiding the movement of the float needle, the needle housing having a lower opening and an upper opening, a vent chamber disc molded about the housing, a plurality of vent guide ribs defined in the surface of the chamber disc;

a rubber seat seal being insertable into the lower opening of the needle housing for receiving the float needle;

a locating ferrule biased against the bottom of the seat seal to maintain the seat seal in proper position within the housing tube;

a vent chamber barrier having an indented lower surface engaging with the guide ribs of the chamber disc to form a vent chamber;

a cell cap having a hollow transition unit molded to its underside, a passageway extending therethrough for receiving the assembly comprising the housing tube, the rubber seat seal, the vent chamber disc and the locating ferrule, all being insertable through a bottom entry of the passageway, the nose cone section of the float needle extending through a bottom opening in the cell cap, the transition unit having means to connect the cell cap with the float chamber housing;

a rubber gasket forming a liquid impermeable seal between the cell cap and the battery cell;

a fill inlet cover having a chamber within, the chamber having a circular opening with means for connecting the cover to the housing tube, a fill inlet line for bringing in water from a reservoir, whereby the battery cell upon being filled to the proper level will cause the float container to rise, thereby raising the needle nose cone, which then forms a fluid seal with the seat seal shutting off the flow of water when the cell electrolyte has been replenished.

2. The cell plug according to claim 1, wherein the float chamber housing comprises:

the chamber housing being of a cylindrical shape;

the interior surface of the annular wall being fluted to reduce capillary, static and friction forces; and a preformed groove defined in the interior surface in close proximity to the top opening for engagement with the connecting means of the transition unit.

3. The cell plug according to claim 2, wherein the float container comprises:

an upper float section having an upper surface;

a lower disc section connected to the upper float section;

the upper surface having a circular aperture defined in the center portion for receiving the slotted bottom of the float needle;

the upper surface being dome shaped to prevent water residue thereon; and the lower disc being dome shaped to prevent air bubble entrapment.

4. The cell plug according to claim 3, wherein the float needle comprises:

an elongated central axis stem extending the length of the needle;

a plurality of integral fin projections equidistantly spaced about the stem;

a bullet shaped tip at the upper portion of the needle; and a hollow rubberized nose cone having an interior cavity sufficiently large to extend over the tip to form a tight flexible fit, the nose cone having defined therein an annular air space for providing cushioning.

5. The cell plug according to claim 4, wherein the needle housing tube includes:

a shoulder section encircling about the upper portion of the tube for providing support for the cell cap;

an abutment deposed within the central area of the housing tube for positioning of the rubber seat seal within the housing tube; and a plurality of raised concentric rings located in close proximity to the upper opening for engagement with the fill inlet cover, the cover having means for connecting to the housing.

6. The cell plug according to claim 5, wherein the rubber seat seal includes:

an upper surface biasing against the abutment of the housing;

a tapered inner wall defining a seating area for the needle nose cone;

a bottom orifice for receiving the nose cone; and a tapered opening defined in the upper surface for partially receiving the nose cone upon satiation of the cell electrolyte, the upwardly moving float container propelling the needle nose cone through the tapered opening to form an impermeable fluid seal, thereby closing the flow of water to the cell.

7. The cell plug according to claim 6, wherein the cell cap includes:

a cell vent hole for exhausting any trapped gases;

the connection means of the transition unit having an O-ring projection engulfing the body of the unit for friction fitting into the preformed groove of the float chamber housing; and a pair of vent slots located at the bottom opening for alignment with the oval vent openings.

8. The cell plug according to claim 7, wherein the connecting means of the fill inlet cover includes:

a plurality of circular channels defined within the chamber in close proximity to the bottom opening, whereby the fill inlet cover press fittingly receives the plurality of raised rings of the housing tube to form a tight fluid proof seal.

9. The cell plug according to claim 8, wherein the fill inlet cover further includes a water exit line integral with the cover, whereby upon the cell being sated the water will flow to another cell plug in series.

10. The cell plug according to claim 8, wherein the fill inlet cover further includes:

an overflow line integral with chamber section of the cover;

a lid opening in the top section of the chamber;

a chamber lid having a gasket means for connecting the lid to the chamber;

a float valve section integrally deposed within the chamber, the valve section having a conical seat portion in the upper part of the valve section; and an overflow float deposed above the valve section, the float having a tapered end which deposes within the conical seat until the cell is fully refilled, whereby upon the battery cell being completely sated, the water pressure will lift the overflow float out of the conical seat portion of the valve section allowing water to pass out of the chamber through the overflow line, thereby alerting the operator that the procedure is completed.

* * * * *